Figure 1:
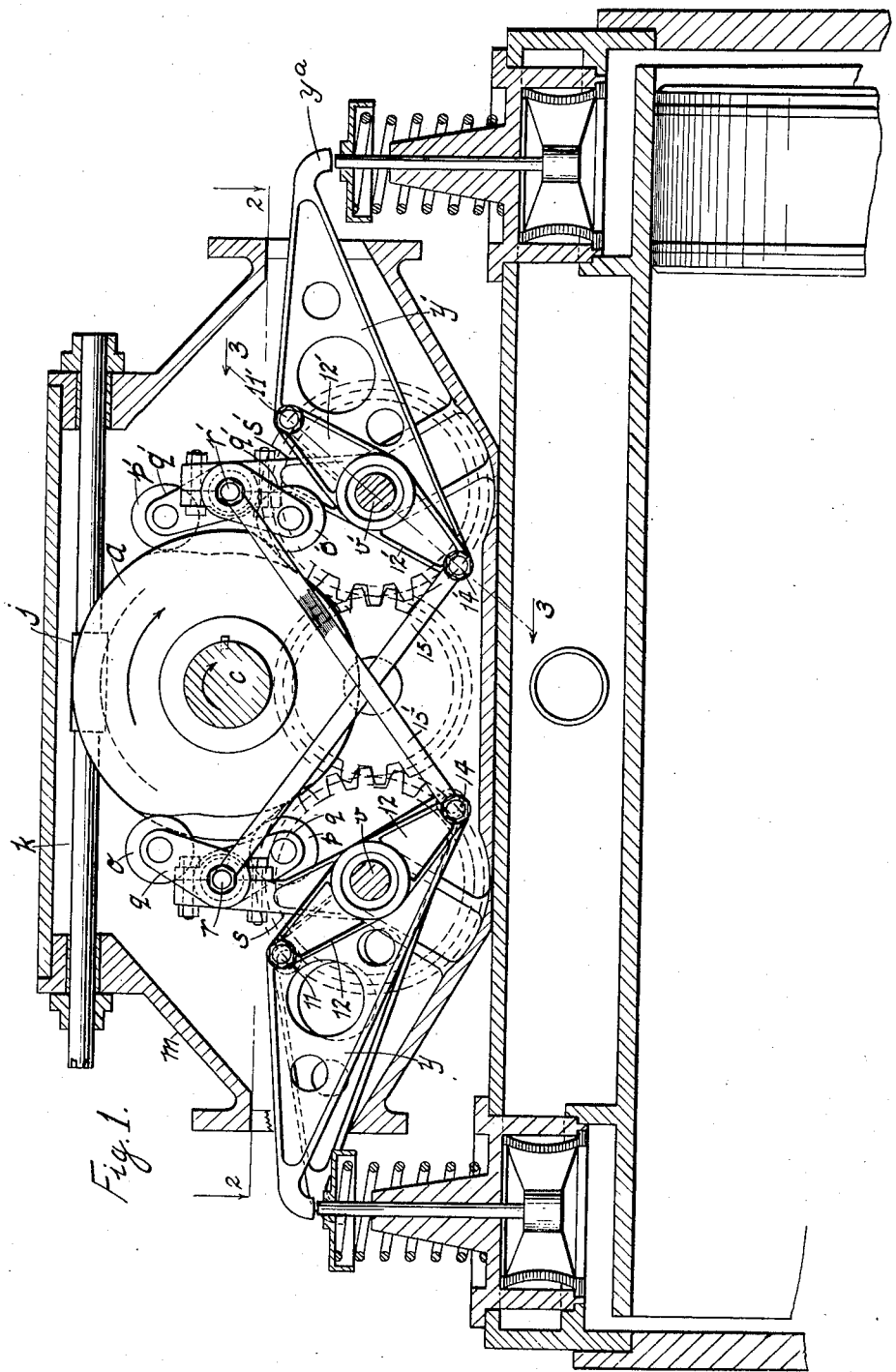

Nov. 19, 1935.  W. H. TUBBS  2,021,469
REVERSING MECHANISM FOR STEAM ENGINES
Filed July 27, 1932   6 Sheets-Sheet 3

Inventor:
William H. Tubbs
M. H. Lockwood

Nov. 19, 1935.  W. H. TUBBS  2,021,469
REVERSING MECHANISM FOR STEAM ENGINES
Filed July 27, 1932  6 Sheets-Sheet 4

Inventor.
William H. Tubbs
M. H. Lockwood
Attorney.

Nov. 19, 1935.    W. H. TUBBS    2,021,469
REVERSING MECHANISM FOR STEAM ENGINES
Filed July 27, 1932    6 Sheets-Sheet 6
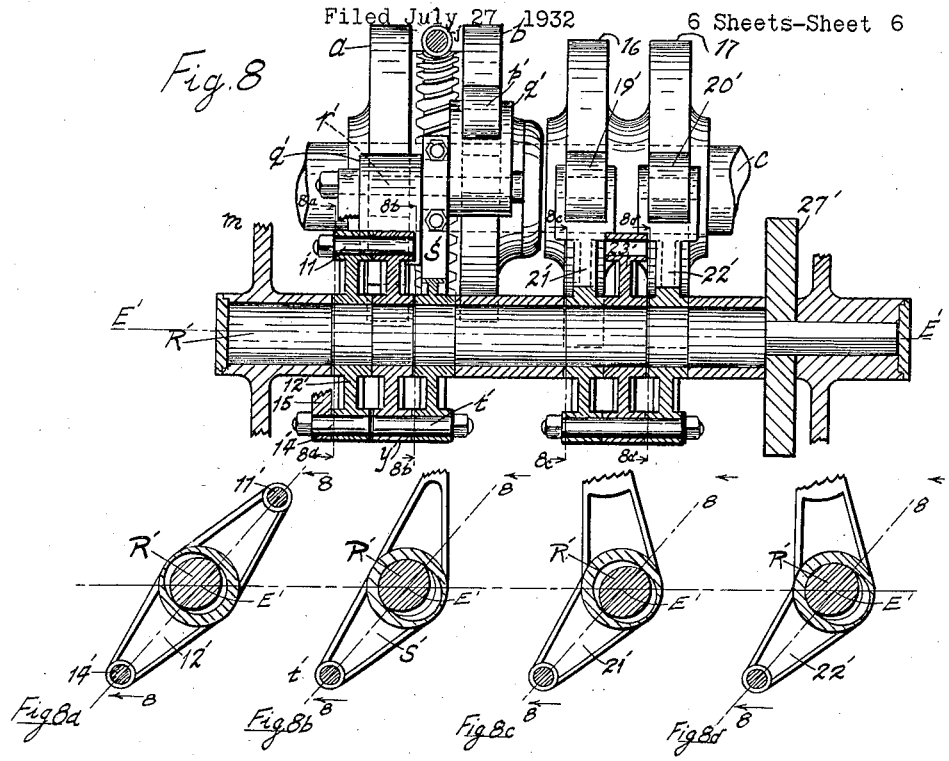
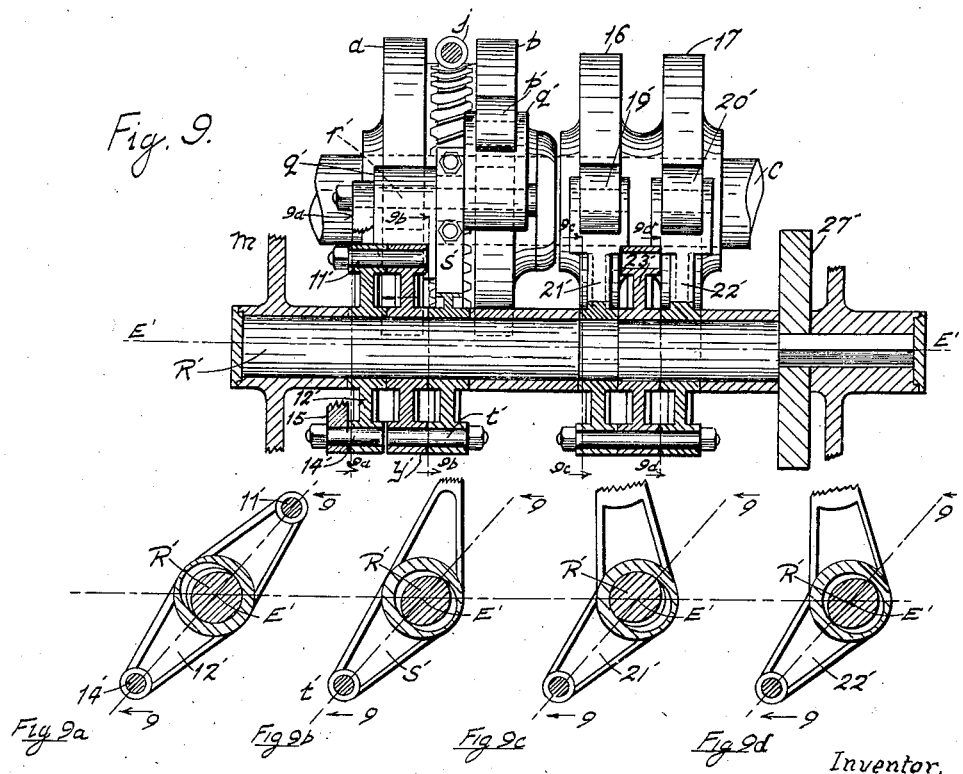
Inventor.
William H. Tubbs
M. H. Lockwood
Attorney.

Patented Nov. 19, 1935

2,021,469

UNITED STATES PATENT OFFICE 2,021,469

REVERSING MECHANISM FOR STEAM ENGINES

William Henry Tubbs, Drayton, Cosham, England

Application July 27, 1932, Serial No. 624,976
In Great Britain August 4, 1931

8 Claims. (Cl. 121—127)

This invention relates to reversing mechanism for steam engines, and has for its object to simplify the means employed for reversing the engine.

According to this invention the motion for actuating any valve of a double action cylinder is transmitted thereto from cams rotating at engine speed by a lever which rocks about a fixed axis. One arm of this lever operates the valve and the other arm, or arms, are, by the mechanism hereafter described operated from either one of two rollers or sets of rollers which receive suitable motion from the cams. When the mechanism is arranged to operate a lever from one set of rollers the resulting motion of the crank is in the opposite direction from that resulting from the operation of that valve lever from the other set of rollers. For steam inlet valves requiring varying cut offs, the alternative sets of rollers are arranged so that to change the direction of rotation of the crank the valve lever for one end of the cylinder is by the mechanism described released from operation by the set of rollers previously operating it and put under the operation of the set of rollers which was previously controlling the inlet valve lever for the other end of the cylinder, and vice versa. For valves of constant opening such as the exhaust valves the mechanism releases the valve lever at either end of the cylinder from operation by a roller and cam suitable to the first direction of crank rotation and places the valve lever under the control of a roller and cam suitable to the reversed direction of crank rotation.

For this purpose each of the valve levers is connected with a pair of levers either one of which may pivot about the same fulcrum as the valve lever and the other one then being prevented from using this fulcrum. Motion is then transmitted to the valve lever via that adjacent lever which for the time being rocks about the same fulcrum as the valve lever, the other lever rocking idly about its point of connection with the valve lever.

Each of the said levers may be formed intermediately of its length with an eye through which passes a rod, the longitudinal axis of which is fixed but about which axis the rod may be rotated and to and fro along which axis it may be slid for reversing as described later. This rod forms the fulcrum for the valve lever and is grooved peripherally, so that when according to its position it forms a fulcrum also for one lever of the pair of levers, a grooved portion of the rod registers with the eye of the other lever of the said pair and so permits this other lever to rock idly.

With such a construction the means for imparting motion to a valve controlling one end of the cylinder may be caused to actuate a valve controlling the other end of said cylinder by linking said means with one of the pair of levers appertaining to the corresponding valve controlling said other end of the cylinder.

Figure 2:
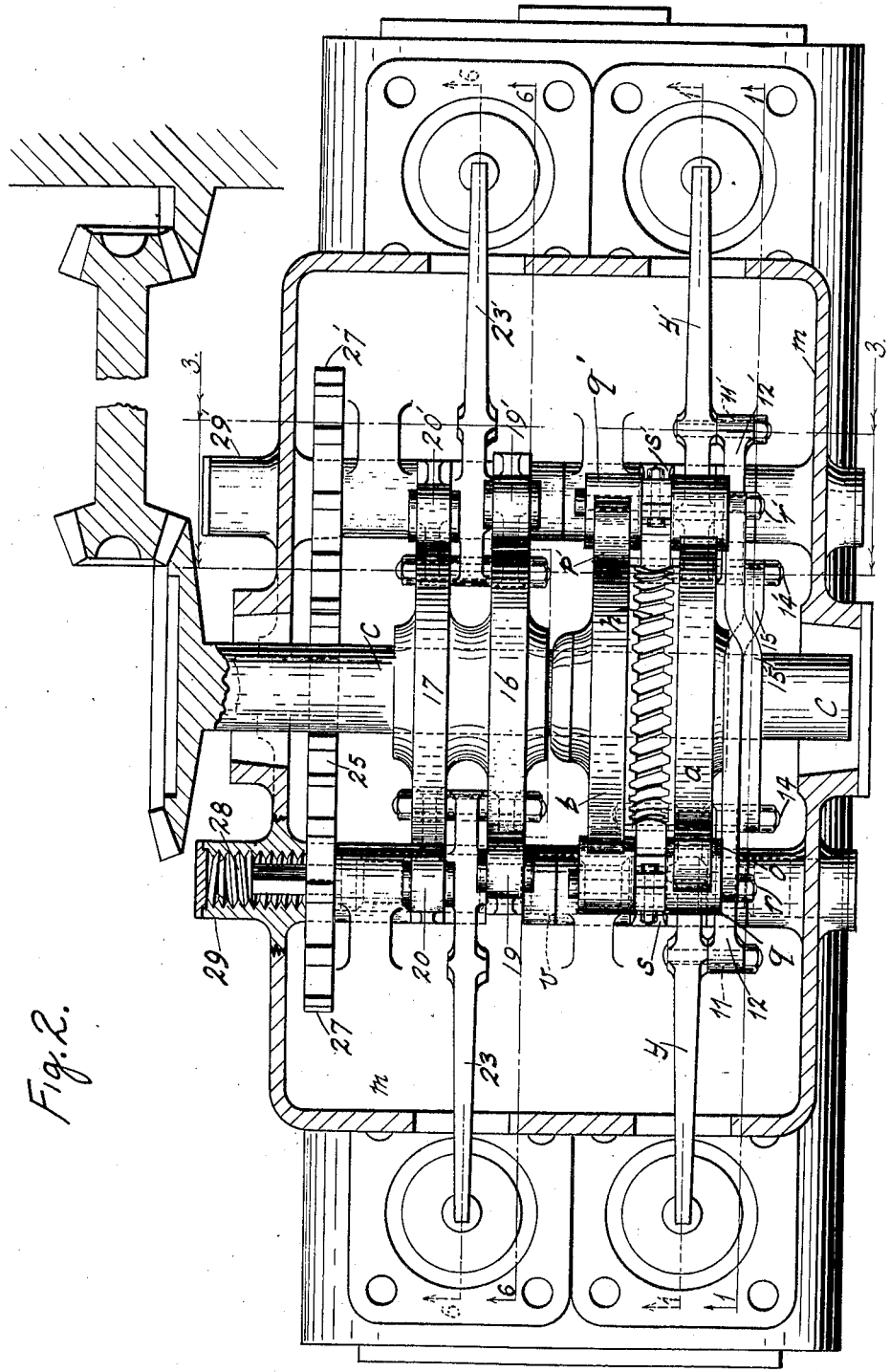

The accompanying drawings serve to illustrate the invention, Figure 1 being a sectional side elevation along the line 1—1 of Figure 2, of one form of the improved means for actuating the inlet valves of a double acting cylinder having poppet valves.

Figure 3:
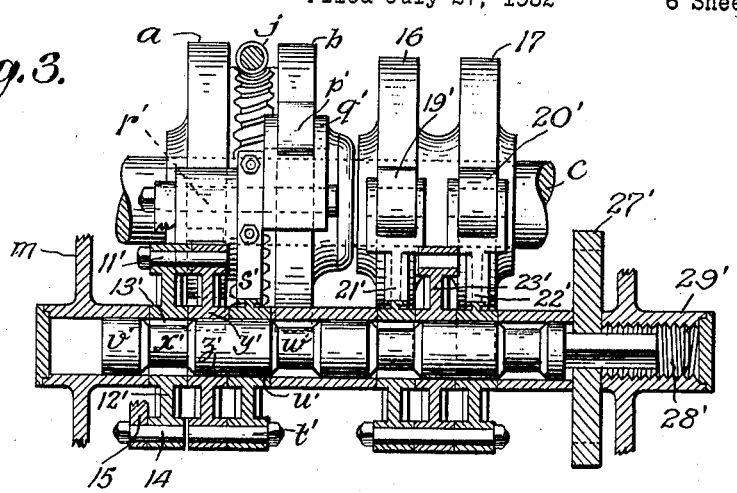
Figure 3A:
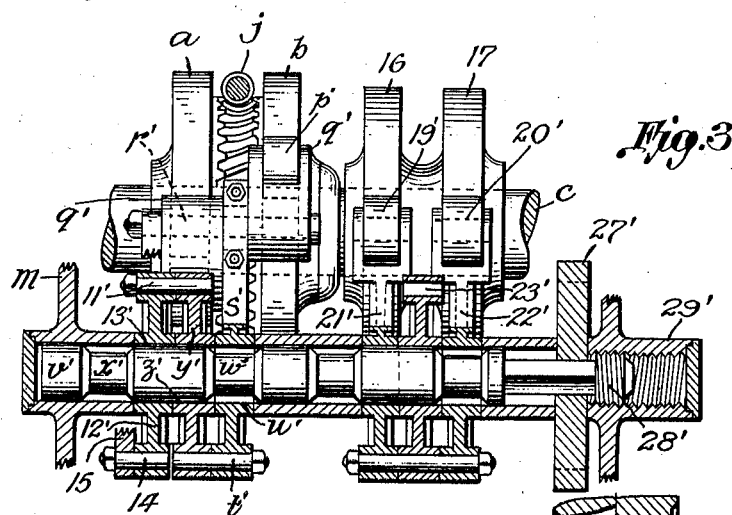
Figure 4:
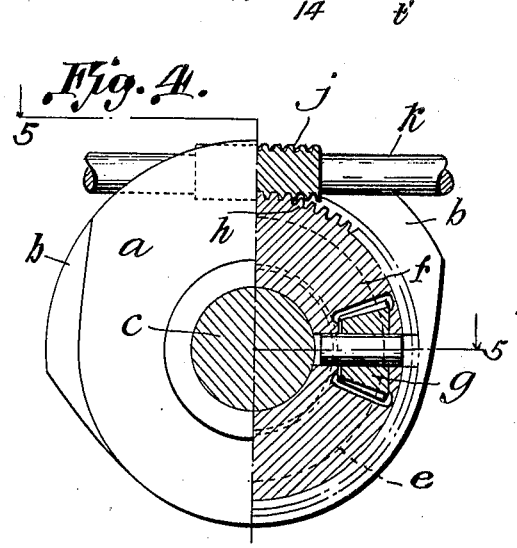
Figure 5:
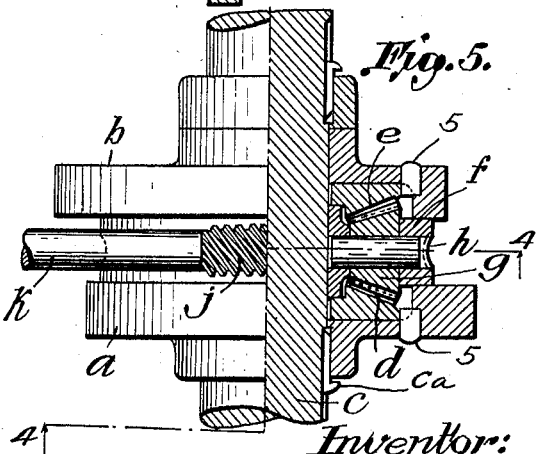
Figure 6:
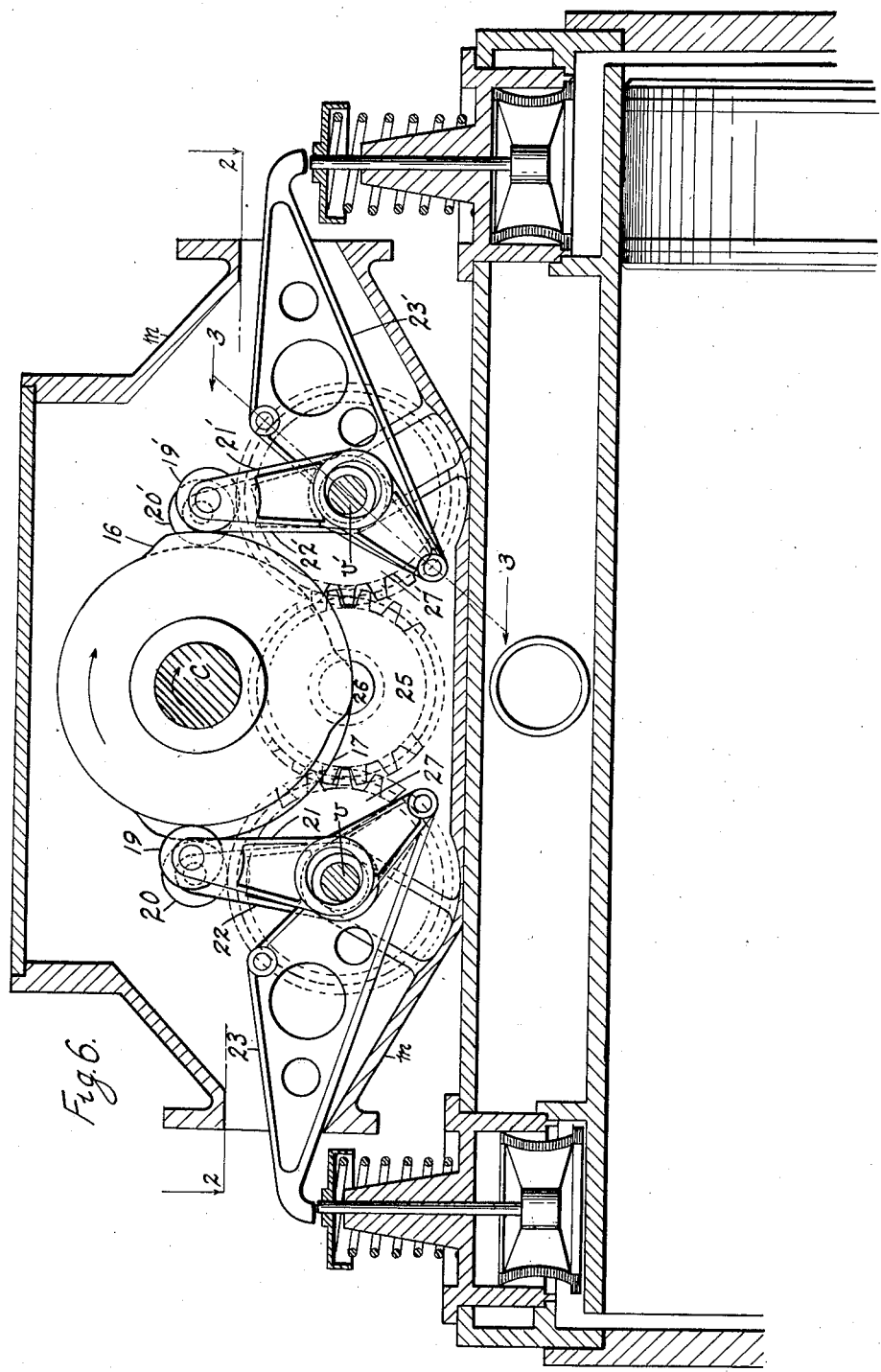
Figure 7:
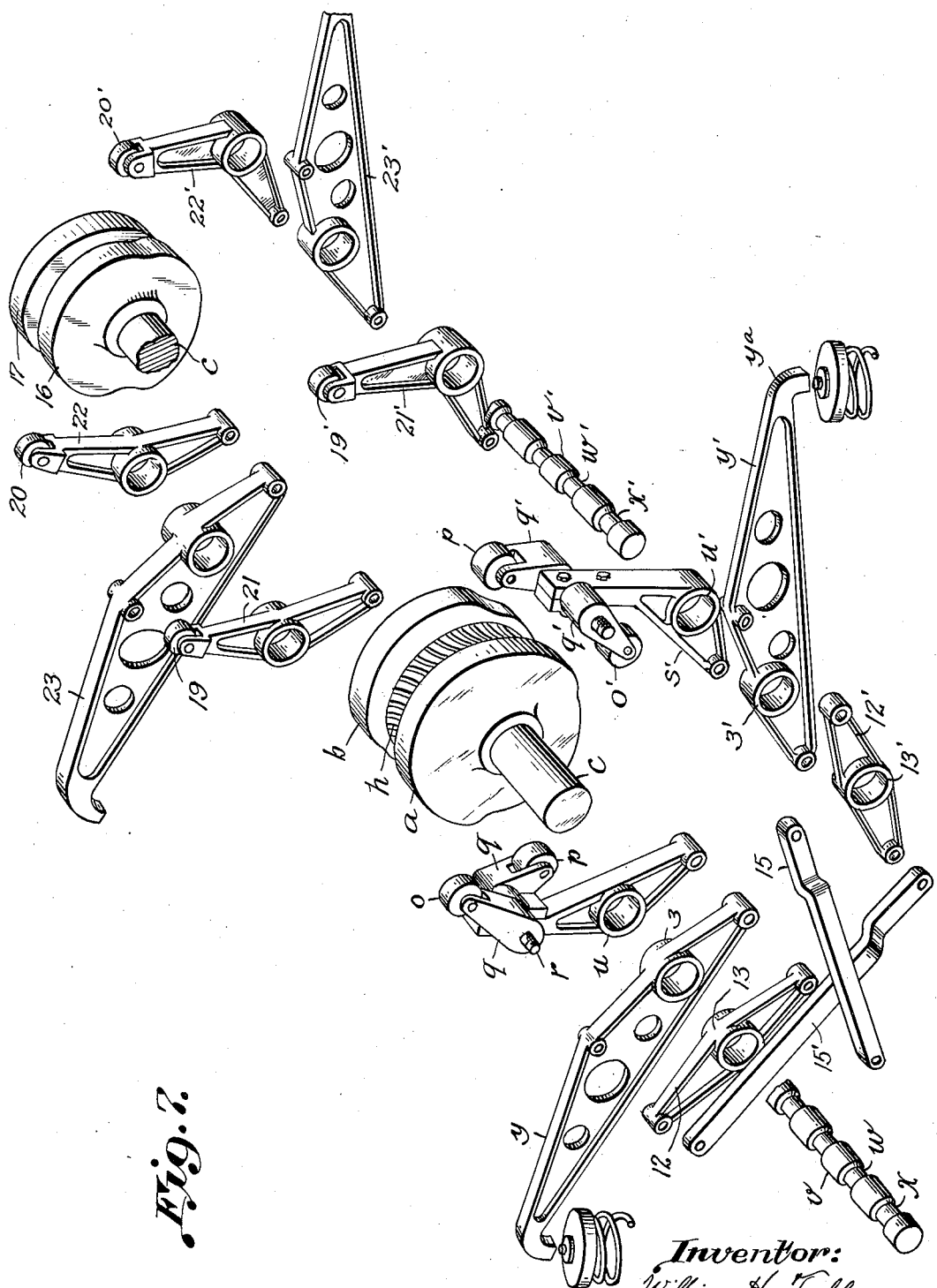

Figure 2 is a plan view along lines 2—2 of Figures 1 and 6, of means for actuating the inlet and exhaust valves, parts being broken away for the sake of clearness; Figure 3, a sectional elevation on the line 3—3 in Figures 1, 2 and 6 and Figure 3a a similar view but showing the gear arranged for reversed rotation of the crank; Figure 4 a half sectional view on line 4—4 of Figure 5 showing a plate or ring which carries bevel pinions; Figure 5 a half sectional plan thereof on line 5—5 of Figure 4; Figure 6 corresponds with Figure 1 but shows the exhaust valve portion instead of inlet valves, as viewed from section line 6—6 in Figure 2; Figure 7 is an exploded view of the cams and cooperating parts. Figure 8 corresponds with Figure 3, but shows a form of the rod about which the levers fulcrum which need be rotatable only instead of slidable and rotatable as is shown in Figure 3, the corresponding formation of the eyes of the levers is also indicated; Figure 9 corresponds with Figure 3a but with a rotatable rod instead of a slidable and rotatable rod; Figures 8a, 8b, 8c and 8d are part sections along the lines 8a—8a, 8b—8b, 8c—8c and 8d—8d, in Figure 8; Figures 9a, 9b, 9c, and 9d are part sections along the lines 9a—9a, 9b—9b, 9c—9c and 9d—9d in Figure 9.

As shown in Figures 1 to 5 a pair of corresponding right and left handed cam discs $a$ and $b$ are mounted on a shaft $c$ driven by the engine at the same speed as the engine, the cam disc $a$ being held fast by a key $ca$ (Figure 5), and the cam disc $b$ being freely rotatable, on said shaft. The cam discs $a$ and $b$ which are formed with annular grooves on their inner faces in which rings of bevel gear teeth are mounted as at $d$ and $e$ (Figure 5) and secured by dowels 5 or the like. The cam discs $a$ and $b$ with gears $d$ and $e$ are spaced apart axially and between them is disposed a plate or ring $f$ carrying radially disposed bevel pinions such as $g$ meshing with the bevel teeth $d$ and $e$ so that when the shaft $c$ is driven the cam discs $a$ and $b$ rotate in opposite directions, the free rotation of the plate or ring $f$ being prevented as set out hereinafter. The plate or ring $f$ is formed peripherally as a worm wheel $h$ with which meshes a worm $j$ on a spindle $k$ mounted in bearings in a casing $m$ and operable, by a means not shown which may be attached at the left hand end of the spindle $k$ for operation from a suitable position, e. g. the cab of a locomotive.

Oppositely disposed relatively to the cam discs $a$ and $b$ and bearing against the cam surfaces thereof are two pairs of rollers $o$, $p$ and $o'$, $p'$; the rollers at each side being carried by arms such as $q$, $q'$ which are rigid on spindles $r$, $r'$ mounted on levers $s$, $s'$ pivoted on pins $t$, $t'$, see Figure 3, the arrangement being such that according to the relative angular positions of the cams $a$ and $b$ the rollers $o$ and $p$, or $o'$ and $p'$ of a pair will rise and fall radially of the cams.

If the roller $o$ or $o'$ rises to the same extent as the roller $p$ or $p'$ falls (or vice versa) no motion is imparted to the lever $s$ or $s'$ but if such rising and falling is unequal the lever $s$ or $s'$ is rocked relatively to the common axis (shaft $c$) of the cams $a$ and $b$. Intermediately of its length the lever $s$ or $s'$ is formed with an eye $u$ or $u'$ through which passes a slidable and rotatable rod $v$ or $v'$ grooved peripherally at $w$ and $x$ or $w'$ and $x'$. Also pivoted on the pin $t$ or $t'$ is a lever $y$ or $y'$ formed with an eye $z$ or $z'$ the end of the lever $y$ or $y'$ remote from the pin $t$ or $t'$ being pivoted to a pin 11 or 11' to which is also pivoted one end of a lever 12 or 12' formed with an eye 13 or 13' the rod $v$ or $v'$ passing through the eyes $z$ or $z'$ and 13 or 13' whilst that end of the lever 12 or 12' remote from the pin 11 or 11' is pivoted to a pin 14 or 14' to which is also pivoted one end of a link 15' or 15 the other end of which is pivoted to the spindle $r'$ or $r$ on the other side of the cam discs.

When the parts are in the position shown in Figure 3, movement of the lever $s'$ away from the common axis of the cams $a$ and $b$ causes said lever $s'$ to turn about the rod $v'$ as a fulcrum, hence as the pin $t'$ connects the lower end of the levers $s'$ and $y'$ both said levers rock similarly about the rod $v'$ thus imparting to the outer end $y^a$ of the lever $y'$ the necessary movement to actuate a poppet valve. The movement imparted to the lever 12' by the link 15 connected to the lever $s$ on the opposite side merely causes said lever 12' to rock idly about the pin 11' as a pivot because the peripheral groove $x'$ registers with the eye 13' of said lever and presents the necessary clearance for such idle movement. When, however, the rod $v'$ is slid axially (Figure 3a) so as to bring the peripheral groove $w'$ into register with the eye $u'$ of the lever $s'$ and so as to move the peripheral groove $x'$ out of register with the eye 13' of the lever 12' the movement imparted to the lever 12' by the link 15 will be transmitted to the lever $y'$ through the pin 11' and both the levers 12' and $y'$ will rock about the rod $v'$ as a fulcrum, the lever $s'$ rocking idly about the pin $t'$ as a pivot. Hence each inlet valve will be actuated by movement of the outer end $y^a$ of a lever $y$ or $y'$ such movement being derived from movement of the rollers $o$, $p$ or $o'$, $p'$ either on the same, or on the opposite side of the cams $a$, $b$, according to the position of the rod $v$ or $v'$.

When the shaft $c$ is driven the worm $j$ serves as an abutment for the plate or ring $f$, hence the cams $a$ and $b$ are revolved in opposite directions and in order to superimpose on such movements a further relative angular movement of said cams to vary the cutoff the rod $k$ is rotated and the plate or ring $f$ is turned by the worm $j$ and worm wheel teeth $h$, the cam disc $a$ serving as an abutment, so that the angular movement of the cam disc $b$ is twice that of the plate or ring $f$.

The mechanism for actuating the exhaust valves is simpler as no variation of cut off is required. As shown in Figures 2 and 6 a pair of cams 16 and 17, angularly displaced relatively to one another to a predetermined extent, are keyed to a driving shaft $c$ and pairs of rollers 19, 19' and 20, 20' mounted on the levers 21, 21' and 22, 22', bear against the cam surfaces from opposite sides thereof. The levers 21, 21', 22 and 22' are similar to the levers $s$ and $s'$ of the inlet valve gear and are adapted to act upon levers 23, 23', similar to the levers $y$ and $y'$, the one lever of each pair of rollers 19, 19' and 20, 20' acting on the said levers 23 and 23' and the other lever of said pair rocking idly according to the position of rods $v$ and $v'$. In the case of the exhaust valve gear, the one or other of the rollers 19, 20 or 19', 20' on the one side of the cams serves for the actuation of the exhaust valve on the same side of the cams for forward or reverse running, as the case may be. Figures 1, 2, 3, 3a, and 6, illustrate one method of sliding the rods $v$ and $v'$ axially. As shown a gear wheel 25 mounted on a shaft 26 meshes with gear wheels 27, 27' slidably mounted on squared portions of the rods $v$, $v'$ whilst threaded ferrules 28, 28' fast on the said squared portions engage threaded cups 29, 29' on the casing $m$ of the gear. Hence when the shaft 26 is turned the ferrules 28, 28' on the rods $v$, $v'$ turn in the cups 29, 29' and move the rods axially.

Instead of an axially slidable rod such as $v$, or $v'$ for reversing purposes, a rotatable rod, formed with parts of reduced diameter, may be substituted, if the eyes of the levers be formed with recesses freely to accommodate the full diameter portions of the rod, when suitably positioned, to enable said levers to rock idly. This form is shown in Figures 8, 8a—8d and 9, 9a—9d, the rotatable rod R' is formed where it passes through the eye of the lever 12' with a reduced section by removing from one side of the rod, over a width equal to that of the eye of the lever, a crescent shaped portion of its full circular area, leaving the surface of the rod curved at the radius of the rod for this undercut portion but the centre of curvature is now displaced a suitable distance H from the centre of the rod and towards that side of the rod which has been untouched. The eye of the lever is in a similar manner enlarged on one side by removing a crescent shaped portion from one side of the eye, over the full thickness of the eye, leaving a surface of same radius of curvature as the eye but the centre of curvature is now displaced a suitable amount away from the original centre of the eye and towards the side where the eye has been enlarged. When the rod is in such a position that original centre of the rod coincides with the original centre of the eye and the undercut portion of the rod is against the recessed portion of the eye the lever will fulcrum on the rod under the action of any force acting in the right direction. If however, under the action of the gear wheel 27' (Figures 8 and 9) (which is mounted on a square on the rod R' and is controlled by the gear wheel 25 carried on the spindle 26 the rod R' is now revolved through an angle of 180 degrees about its centre E' then the full radius portion of the rod is brought against the enlarged portion of the eye and the undercut portion of the rod is brought opposite the normal radius portion of the eye with the result that the lever is now free to swing through an angle each side of its first position.

From the foregoing it will be clear that the valves may be actuated for forward or reverse running by mechanism which does not include a multiplicity of relatively small and delicate parts, hence it is well adapted to withstand the severe conditions obtaining e. g. on a locomotive.

I claim:

1. In a reversing mechanism for steam engines the combination comprising cams rotating in unison with the engine, valve levers for opening the engine valves, diametrically opposite follower rollers cooperating with said cams, intermediate levers carrying said follower rollers at one end and pivoted at their other ends to arms of adjacent valve levers, reversing levers pivoted at one end to other arms of adjacent valve levers, cross links having their one ends pivotally connected to the free ends of said reversing levers and their other ends pivotally connected to the follower roller ends of the respective intermediate levers on opposite sides of said cams, and means cooperating with the intermediate and reversing levers for rendering the valve levers operable by the follower rollers of adjacent intermediate levers while the adjacent reversing levers move idly, and vice versa.

2. In a reversing mechanism for steam engines the combination comprising cams rotating in unison with the engine, diametrically opposite follower rollers cooperating with said cams, valve levers to be operated by said follower rollers for opening the engine valves, fulcrum members providing fulcrums for said valve levers, a plurality of intermediate levers arranged on opposite sides of said cams for cooperation with said fulcrum members, certain of said intermediate levers carrying follower rollers and being pivotally connected to the respective valve levers, all of said intermediate levers having fulcrum eyes normally registering with said fulcrum members, said fulcrum members having cut away portions for rendering the fulcrum eyes of said intermediate levers inoperative as pivots, and means for moving said fulcrum members so that the cut away portions by cooperation with the eyes of certain of said intermediate levers to render the latter inoperative, while portions of said fulcrum members not cut away render other of said intermediate levers operative by cooperation with the respective eyes, and means including inter-connections between intermediate levers on opposite sides of said cams for operating said valve levers from the follower rollers on the same or opposite sides of the cams according to the positions of said fulcrum members and their cut away portions.

3. In a reversing mechanism for steam engines the combination as in claim 1, where in the valve levers are fulcrumed on movable fulcrum members and the intermediate and reversing levers have fulcrum eyes arranged to register with the fulcrum members, said fulcrum members having cut away portions which by cooperation with the fulcrum eyes of the intermediate and reversing levers render such levers inoperative, and means for moving said fulcrum members to bring the cut away portions into cooperation with the eyes of either the intermediate or reversing levers, the arrangement being such that when said fulcrum members are positioned to render the intermediate levers inoperative the reversing levers are operative and vice versa and means including cross links connecting the intermediate and reversing levers on opposite sides of said cams for operating the respective valve levers by the follower rollers on the same or opposite sides of said cams according to the position of said fulcrum members.

4. In a reversing mechanism for steam engines the combination comprising cams rotating in unison with the engine, valve levers for opening the inlet valves of the engine, diametrically opposite follower rollers cooperating with said cams for operating said valve levers, intermediate levers carrying said follower rollers, means for connecting said intermediate levers with adjacent valve levers, means including crossed links for connecting said intermediate levers with remote valve levers, and means for effecting said connections between the intermediate levers and the respective valve levers alternatively.

5. In a reversing mechanism for steam engines the combination comprising two sets of cams rotating in unison with the engine, inlet and exhaust valves for the engine, levers for opening said inlet and exhaust valves, diametrically opposite follower rollers cooperating with the respective cams, intermediate levers carrying follower rollers at one end and pivoted at their other ends to arms on adjacent valve levers, reversing levers for the inlet valves pivoted at one end to other arms on the inlet valve levers, crossed links pivotally connected at their one ends to the free ends of said reversing levers, the other ends of said crossed links being pivotally connected to those ends of the intermediate levers associated with the inlet valve levers which carry the follower rollers for said inlet valves on the opposite side of said cams, and means cooperating with said intermediate and reversing levers for rendering the respective inlet and exhaust valve levers operable by one or another of the intermediate levers at a time, whilst the other intermediate lever for the exhaust or reversing lever for the inlet valve as the case may be, moves idly, or vice versa.

6. Reversing mechanism for a steam engine cylinder comprising two inlet valves and two exhaust valves, valve levers for opening said valves, arms on said valve levers, a pair of exhaust cams and a pair of inlet cams all rotating at engine speed, two pairs of diametrically opposite follower rollers cooperating with said exhaust cams, two intermediate levers and two reversing levers each carrying one of said follower rollers at one end and pivoted to the adjacent exhaust valve lever at the other end, two diametrically opposite pairs of follower rollers cooperating with said inlet cams, two intermediate levers each carrying one of said pairs of follower rollers and pivoted to an arm of the adjacent inlet valve lever at the other end, two reversing levers each pivoted at one end to the other arm of one of said inlet valve levers, two crossed links each connected at one end with one of said pairs of follower rollers and at the other end with that end of the remote reversing lever remote from its valve lever, two concurrently movable reversing rods, fulcrums on said rods for said valve levers, said intermediate levers and said reversing levers, cutaway portions on said rods and means to move said rods to bring a cut-away portion into register with each reversing lever when said valve levers and said intermediate levers are on said fulcrums and vice versa, so that said valve levers are adapted to be operatively connected with the intermediate levers and the reversing levers alternatively, said reversing levers or said intermediate levers as the case may be moving idly.

7. In a reversing mechanism for steam engines, the combination comprising cams rotating in unison with the engine, valve levers for opening the exhaust valves of the engine, two pairs of diametrically opposite follower rollers cooperating with said cams, a pair of intermediate levers associated with each pair of follower rollers, each intermediate lever carrying one of said follower rollers at one end and pivoted at the other end to an adjacent valve lever, two concurrently movable reversing rods, said intermediate levers having fulcrum openings for cooperation with the respective rods, fulcrums on each reversing rod for the intermediate levers and the adjacent valve lever, each rod having cut-away portions to allow motion of intermediate levers without fulcruming, and means for moving said rods to bring the cut-away portions of the respective rods into register with one of said intermediate levers when the other intermediate lever and its valve lever are on said fulcrums and vice versa, so that each of said valve levers is adapted to be operatively connected with one of a pair of adjacent intermediate levers, permitting the other intermediate lever to move idly.

8. In a reversing mechanism for steam engines the combination comprising reversing mechanism as in claim 1, for operating the inlet valves of the engine and a pair of exhaust cams rotating in unison with the engine, valve levers for opening the exhaust valves of the engine, two pairs of diametrically opposite follower rollers cooperating with said exhaust cams, a pair of intermediate levers associated with each pair of follower rollers, each intermediate lever carrying one of said follower rollers at one end and pivoted at the other end to an adjacent exhaust valve lever, two concurrently movable reversing rods, said intermediate levers having fulcrum openings for cooperation with the respective rods, fulcrums on each of said rods for the valve lever and associated intermediate and reversing levers of an inlet valve and for the valve lever and intermediate levers of an exhaust valve, each rod having cut-away portions to prevent fulcruming of the respective levers and means for moving each rod to bring cut-away portions into register with a reversing lever for an inlet valve and for one of the intermediate levers for an exhaust valve when the intermediate lever for an inlet valve and the other intermediate lever for an exhaust valve are on said fulcrums and vice versa so that the inlet and exhaust valves are reversed simultaneously.

WILLIAM HENRY TUBBS.